(12) United States Patent
Jongmans et al.

(10) Patent No.: US 10,653,060 B2
(45) Date of Patent: May 19, 2020

(54) ELONGATE SICKLE KNIFE

(71) Applicant: CNH Industrial America LLC, New Holland, PA (US)

(72) Inventors: Dre W. J. Jongmans, Klundert (NL); Bart M. A. Missotten, Herent (BE); Frederik Tallir, Esen (BE); Willem Vandamme, Ichtegem (BE)

(73) Assignee: CNH Industrial America LLC, New Holland, PA (US)

( * ) Notice: Subject to any disclaimer, the term of this patent is extended or adjusted under 35 U.S.C. 154(b) by 591 days.

(21) Appl. No.: 15/080,150

(22) Filed: Mar. 24, 2016

(65) Prior Publication Data
US 2016/0278286 A1    Sep. 29, 2016

(30) Foreign Application Priority Data
Mar. 27, 2015   (BE) .................................. 2015/5193

(51) Int. Cl.
*A01D 43/00* (2006.01)
*A01D 34/14* (2006.01)
(Continued)

(52) U.S. Cl.
CPC ............. *A01D 34/14* (2013.01); *A01D 34/13* (2013.01); *A01D 34/135* (2013.01); *A01D 34/145* (2013.01); *A01D 34/18* (2013.01); *A01D 34/30* (2013.01); *A01D 34/305* (2013.01); *A01D 34/32* (2013.01); *A01D 34/33* (2013.01); *A01D 34/34* (2013.01); *A01D 34/40* (2013.01); *A01D 34/404* (2013.01); *A01D 34/408* (2013.01); *A01D 41/14* (2013.01); *A01D 2101/00* (2013.01)

(58) Field of Classification Search
CPC ...... A01D 34/14; A01D 34/13; A01D 34/135; A01D 34/145; A01D 34/18; A01D 34/30; A01D 34/305; A01D 34/32; A01D 34/33; A01D 34/34; A01D 34/40; A01D 34/404; A01D 34/408; A01D 41/14; A01D 2101/00
USPC ........................................................... 56/158
See application file for complete search history.

(56) References Cited

U.S. PATENT DOCUMENTS 636,190 A  * 10/1899 Williams ........................ 56/259
1,532,358 A     4/1925 Weidemann
(Continued)

FOREIGN PATENT DOCUMENTS

FR           1358785 A      4/1964

*Primary Examiner* — Thomas B Will
*Assistant Examiner* — Mai T Nguyen
(74) *Attorney, Agent, or Firm* — Peter Zacharias; Patrick Sheldrake

(57) ABSTRACT

A header for an agricultural vehicle. The header includes a header frame and an elongate sickle knife mounted along a leading edge of the header. The header further includes an actuator for reciprocally moving the elongate sickle knife in its longitudinal direction relative to the header frame between a first position and a second position over an intermediate position. At least one accumulator extends between the header frame and the elongate sickle knife to accumulate energy during a first movement of the elongate sickle knife from the intermediate position towards at least one of the first position and the second position, and to release accumulated energy during a second movement of the elongate sickle knife opposite to the first movement.

18 Claims, 2 Drawing Sheets

(51) Int. Cl.

| | |
|---|---|
| *A01D 34/34* | (2006.01) |
| *A01D 34/33* | (2006.01) |
| *A01D 34/40* | (2006.01) |
| *A01D 34/30* | (2006.01) |
| *A01D 41/14* | (2006.01) |
| *A01D 34/13* | (2006.01) |
| *A01D 34/408* | (2006.01) |
| *A01D 34/32* | (2006.01) |
| *A01D 34/404* | (2006.01) |
| *A01D 34/135* | (2006.01) |
| *A01D 34/18* | (2006.01) |
| *A01D 101/00* | (2006.01) |

(56) References Cited

U.S. PATENT DOCUMENTS

| | | | |
|---|---|---|---|
| 1,907,055 A | | 5/1933 | Frederiksen |
| 2,297,317 A | * | 9/1942 | Paradise ............... A01D 34/30 56/158 |
| 2,548,055 A | | 4/1951 | Polley |
| 3,023,563 A | * | 3/1962 | Tenney ............... A01D 34/135 123/46 SC |
| 3,514,933 A | * | 6/1970 | Beusink ............... A01D 34/02 56/293 |
| 3,657,868 A | * | 4/1972 | Cousino ............... A01D 34/30 56/13.6 |
| 2002/0035827 A1 | * | 3/2002 | Yang ............... A01D 34/13 56/298 |
| 2005/0109005 A1 | | 5/2005 | Polk et al. |

* cited by examiner

ELONGATE SICKLE KNIFE

CROSS REFERENCE TO RELATED APPLICATION

This application claims priority to Belgium Application BE2015/5193 filed Mar. 27, 2015, which is incorporated herein by reference in its entirety.

FIELD OF THE INVENTION

The present invention relates to a header for an agricultural vehicle, wherein the header comprises a header frame and an elongate sickle knife mounted along a leading edge of the header. The header further comprises an actuator for reciprocally moving the elongate sickle knife in its longitudinal direction relative to the header frame.

BACKGROUND OF THE INVENTION

Headers are known and widely used for harvesting crop material with an agricultural harvester. Sickle knives have been used to cut plants, including, but not limited to, hay, grasses, small grains and the like, for many years. The knives typically include an elongate metal sickle bar, with a plurality of knife sections attached along the lengths thereof. The sickle bar normally slides along the header frame, which has guards bolted to the header frame. The sickle bar and header frame are oriented to as to extend sideward along a forward edge portion of the header of the agricultural combine. The sickle bar with the knife sections move reciprocally between the guards so that the leading edges of the knife sections cross over the guards or through slots in the guards. This produces a sheering action which severs plant stems and stalks or other material captured between the knives and the guards. The sickle bar is typically reciprocally actuated by an actuator, which can include, but is not limited to, an eccentric shaft or a rotating hub, a wobble drive, or a similar well known commercially available device. The sickle bar may weigh as much as 30 kilograms or more, and is typically accelerated and decelerated two times per cycle as a result of the reciprocal movement. Thereby, a typical speed for the sickle bar is up to about 16 Hz or cycles per second. The back and forward motion at a high cycle per second generates high acceleration values and high deceleration values that in turn generate high forces on structural components.

US 2005/0109005 aims to decrease the forces on structural components and describes a sickle bar having two segments each equal to one half the sideward extent of the header, which are driven by oscillating devices that are timed such that the sickle bars are travelling in opposite directions. Thereby, US 2005/0109005 describes a mechanism that provides this opposite travel direction in an efficient manner. Due to the sickle bar having two segments travelling in opposite directions, acceleration values as well as forces on the structural components are decreased.

It is an object of the present invention to further decrease forces on structural components of the header that result from the acceleration and deceleration of the elongate sickle knife.

SUMMARY OF THE INVENTION

In accordance with an aspect of the present invention, there is provided a header for an agricultural vehicle, wherein the header comprises a header frame, and a sickle bar or elongate sickle knife mounted along a leading edge of the header, wherein the header further comprises an actuator for reciprocally moving the elongate sickle knife in its longitudinal direction relative to the header frame between a first position and a second position over an intermediate position, wherein accumulator means extend between the header frame and the elongate sickle knife to accumulate energy during a first movement of the elongate sickle knife from the intermediate position towards at least one of the first position and the second position, and to release accumulated energy during a second movement of said elongate sickle knife opposite to said first movement.

An exemplary embodiment of the present invention is based on the insight that the majority of the forces on the structural components of the header are a result of accelerating and decelerating the elongate sickle knife, while only a minority of the forces on the structural components is a result of the actual cutting by the elongate sickle knife. The accumulator means extend between the elongate sickle knife and the header, and are adapted to accumulate energy from the elongate sickle knife when the elongate sickle knife is decelerated by the actuator. The accumulated energy is then released to the elongate sickle knife in that part of the movement when the actuator accelerates the elongate sickle knife. In this way, the accumulator means cooperate together with the actuator in accelerating and decelerating the elongate sickle knife, thereby significantly reducing the forces exerted on actuator components to reciprocally move the elongate sickle knife. Tests have shown that the structural component which bares the heaviest load during movement of the elongate sickle knife is the connection point between the elongate sickle knife and the actuator. This connection point is at least partially relieved since the accumulator means aid in accelerating and decelerating the elongate sickle knife. Thereby, it will be clear that the accumulator means accumulate energy by transforming kinetic energy from the elongate sickle knife into potential energy in the accumulator. When energy is released by the accumulator, the potential energy in the accumulator means is again transformed into kinetic energy of the elongate sickle knife.

Desirably, the first movement comprises a first part where the elongate sickle knife moves from the intermediate position towards the first position, and comprises a second part where the elongate sickle knife moves from the intermediate position towards the second position, and wherein the accumulator means accumulate energy in both the first and the second part of the first movement, and wherein the second movement comprises corresponding parts opposite to the first and second parts of the first movement. In a cycle of the reciprocal movement of the elongate sickle knife, two movement parts can be identified where the elongate sickle knife is accelerated, and two movement parts can be identified where the elongate sickle knife is decelerated. According to an exemplary embodiments, the accumulator means are adapted to accumulate energy in both of the movement parts where the elongate sickle knife decelerates, being the first part where the elongate sickle knife moves from the intermediate position to the first position and the second part where the elongate sickle knife moves from the intermediate position towards the second position. Furthermore, the accumulator means, according to the exemplary embodiment, releases energy in both parts of the movement where the elongate sickle knife accelerates, being the corresponding parts opposite to the first and second part of the first movement. In this exemplary embodiment, structural components of the header are relieved in all accelerating and decelerating movements of the elongate sickle bar.

Desirably, the accumulator means are formed as at least one spring element. A spring element exists in multiple shapes, types and strengths. Types of springs include leaf springs and coil springs. Coil springs can be one directional, pull or push, or can be two directional, pull and push. Furthermore, springs come in strengths, ranging from less than a N per m up till several thousands of N per m. Thereby, spring elements are optimized to transform kinetic energy into potential energy and vice versa. Using at least one spring element, the elongate sickle knife is spring loaded by the spring elements in at least one of, desirably in both of the first position and the second position.

Desirably, the at least one spring element comprises multiple spring elements distributed along the length of the elongate sickle knife. By providing multiple spring elements, the total spring strength can be divided over the multiple springs, so that cheaper springs can be used. Furthermore, springs with lower strengths are easier to handle during maintenance. Furthermore, by dividing the multiple springs over the length of the elongate sickle knife, forces on structural components can be further reduced since the impact of the accumulator means is distributed over the length of the elongate sickle knife. This reduces tensions in the elongate sickle knife that result from accelerating and decelerating the latter.

Desirably, the spring elements are mounted at an underside of the header. Crop material is cut in front of the elongate sickle knife, and is transported over the elongate sickle knife, so that the underside of the elongate sickle knife typically comprises a space for mounting the spring elements. Tests have shown that spring elements mounted at an underside of the header can optimally perform and are easy to reach for maintenance purposes.

Desirably, the header frame comprises multiple guards, extending forward from the leading edge and distributed along the leading edge of the header, wherein the multiple guards each comprise a slit and wherein the elongate sickle knife is positioned at least partially through the slits of the multiple guards to guide the elongate sickle knife in its longitudinal direction. The guards have multiple functions. The first function of the guard is to form, together with the elongate sickle knife, a scissors like cutting mechanism wherein plant stems and stalks or other material can be captured between the knives and the guards. This significantly facilitates the cutting of the crop material. The second function of the guards is to guide the elongate sickle knife sickle knife in its longitudinal direction, and to prevent movement of the elongate sickle knife in other directions. This function is a result of the elongate sickle knife being positioned at least partially in the slit of the guards, so that the position of the elongate sickle knives is limited. Particularly, the elongate sickle knives are prevented from moving forward and from moving upward.

Desirably, the elongate sickle knife comprises a plurality of knife sections attached along the length thereof in such a manner that a reciprocal movement of the elongate sickle knife results in a sheering action which severs plant stems and stalks captured between the knives and the guards. Since the elongate sickle knife comprises a plurality of knife sections, knife sections can be replaced so that maintenance of the elongate sickle knife is facilitated.

Desirably, accumulated energy is released during the second movement by accelerating the elongate sickle knife in the second movement. Further, desirably, energy is accumulated during the first movement by decelerating the elongate sickle knife in the first movement. In this manner, during accumulating, kinetic energy in the elongate sickle knife is transformed into potential energy in the accumulator means, and, during releasing, potential energy from the accumulator means is transformed into kinetic energy in the elongate sickle knife.

In accordance with another aspect of the present invention, there is provided a method for operating a header for an agricultural vehicle, wherein the header comprises a header frame and an elongate sickle knife mounted along a leading edge of the header. The method comprises steps of reciprocally moving the elongate sickle knife in its longitudinal direction relative to the header frame by an actuator between a first position and a second position over an intermediate position; accumulating energy in an accumulator means, which is mounted between the header frame and the elongate sickle knife, during a first movement of the elongate sickle knife from the intermediate position towards at least one of the first position and the second position; and releasing accumulated energy during a second movement of the elongate sickle knife opposite to said first movement.

This method relates to a use of the header in accordance with the exemplary aspect, which is described above. Therefore, the effects and advantages described in relation to the header equally apply to the method.

Desirably, the step of accumulating energy comprises decelerating the elongate sickle knife in the first movement. Further, desirably, the step of releasing accumulated energy comprises accelerating the elongate sickle knife in the second movement. In this manner, kinetic energy is transformed into potential energy and vice versa.

BRIEF DESCRIPTION OF THE DRAWINGS

For the purpose of illustration, there are shown in the drawings certain embodiments of the present invention. In the drawings, like numerals indicate like elements throughout. It should be understood, however, that the invention is not limited to the precise arrangements, dimensions, and instruments shown. In the drawings.

DETAILED DESCRIPTION OF THE INVENTION

Figure 1:
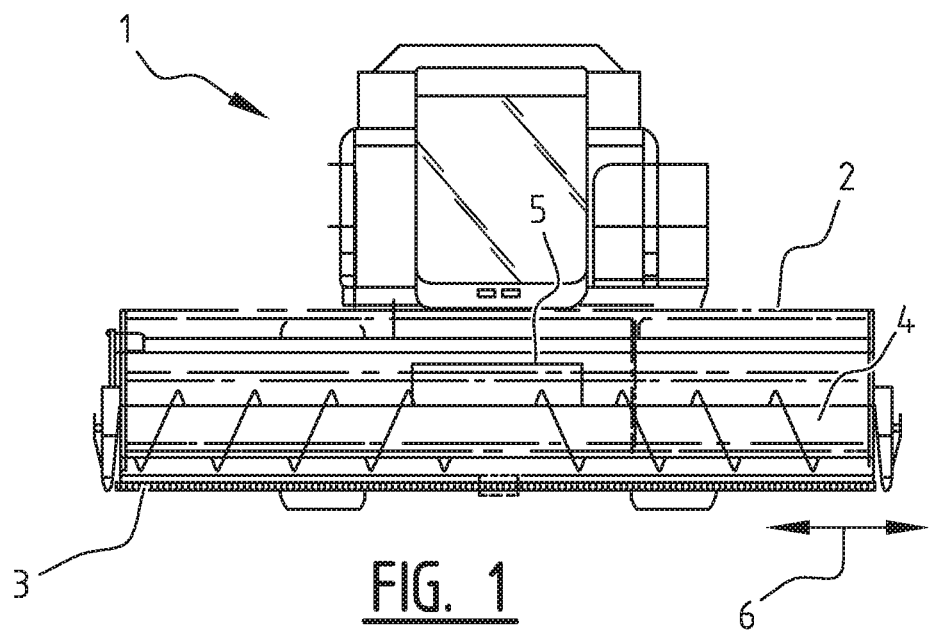
FIG. 1 shows an agricultural harvester with a header, in accordance with an exemplary embodiment of the present invention.

FIG. 1 shows a front view of an agricultural harvester 1 with a header 2, in accordance with an exemplary embodiment of the present invention. In operation, the header 2 is connected to the agricultural harvester 1 and extends in a sideward direction thereof. The header 2 typically comprises an elongate sickle knife 3 at a leading edge of the header 2. The elongate sickle knife 3 of the header 2 is adapted to cut plant stems and stalks of crop material when the agricultural harvester 1 is harvesting a field with the crop material. Other header equipment 4 is adapted to transport the crop material that is cut by the elongate sickle knives 3 towards the feeder 5 of the harvester 1.

Figure 2:
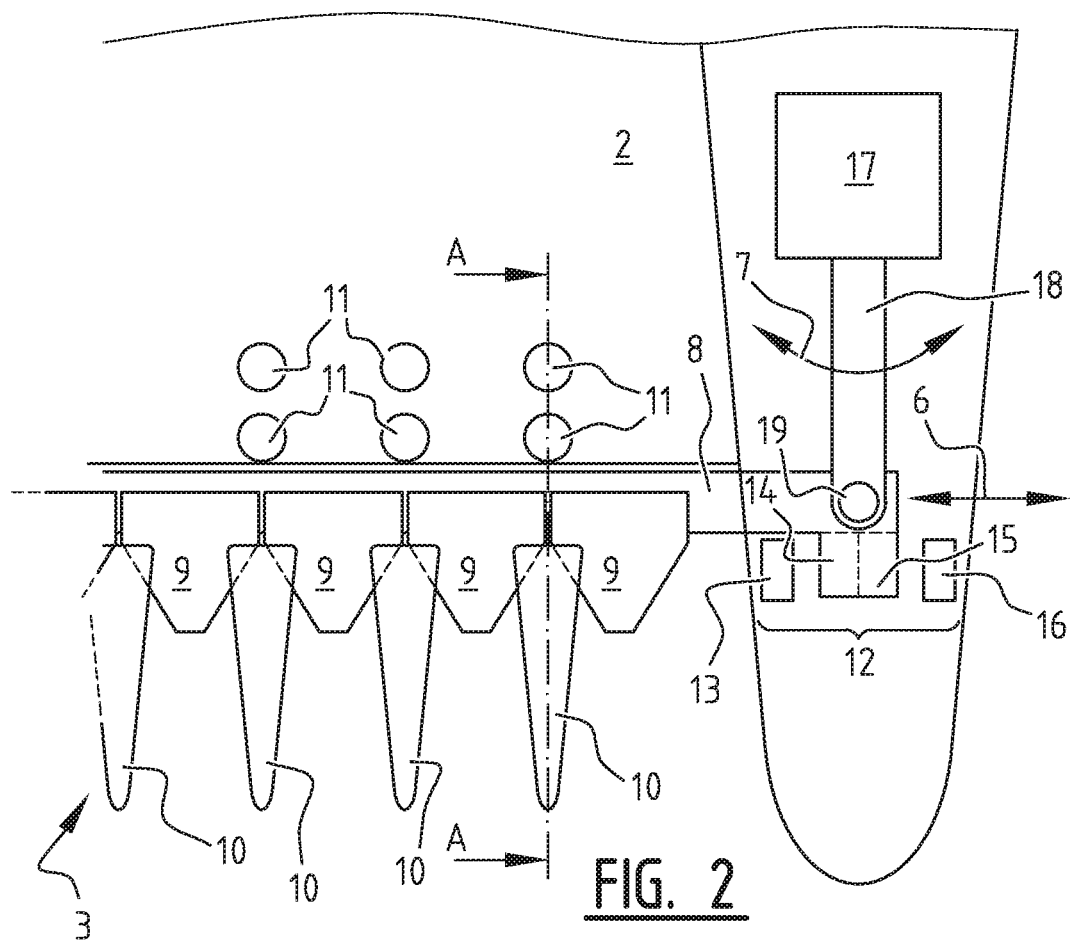
FIG. 2 shows a top view of a section of the header of FIG. 1, in accordance with an exemplary embodiment of the present invention.

FIG. 2 shows a top view of a section of the elongate sickle knife 3 at an edge of the header 2, in accordance with an exemplary embodiment of the present invention. The header 2 is mainly formed by a header frame 2, which header frame 2 is, in operation, rigidly mounted to the agricultural harvester 1. The elongate sickle knife 3 is adapted to reciprocally move with respect to the header frame 2 in a transverse direction 6. Thereby, the transverse direction 6 is transverse to the forward driving direction of the agricultural harvester in operation.

The elongate sickle knife 3 has a bar 8 extending over substantially the complete length of the elongate sickle knife 3. The bar 8 can be in one piece, or can have multiple segments connected to one another. The bar 8 is connected to an actuator 17, for example via an arm 18, which is adapted for reciprocally moving 7, and which is driven by the actuator 17 to reciprocally move the elongate sickle knife 3 in the direction indicated with reference number 6.

Desirably, the bar 8 is provided with multiple knives 9. These knives 9 are reciprocally moved by reciprocally moving the bar 8. Desirably, the header frame 2 is provided with guards 10 that extend from the leading edge of the header 2 in a forward direction. The guards 10, which are fixed with respect to the header 2, together with the knives 9, which reciprocally move with respect to the header 2, act as a sheering device which proves to be optimal for cutting plant stems and stalks. The guards 10 are desirably mounted to the header frame 2 via bolts 11.

Accumulator means 12 are connected between the elongate sickle knife 3 and the frame 2. In the embodiment of FIG. 2, the accumulator means 12 are formed by a set of magnets. Thereby, element 13 and element 14 are cooperating magnets, and element 15 and element 16 are cooperating magnets. Magnets 13 and 14 have the same polarization and magnets 15 and 16 have the same polarization. As a result of having the same polarization, the magnets tend to push each other away when they are moved towards each other. This results in a kinetic energy of the elongate sickle knife 3 to be transformed into a potential energy between the magnets. The example of FIG. 2, when the elongate sickle knife 3 is moved to the left, magnets 13 and 14 will be moved closer to each other so that they decelerate the elongate sickle knife 3, which energy is transformed in a buildup of a repulsive force between magnets 13 and 14. Once the elongate sickle knife 3 reaches its most leftward extreme position, it starts accelerating to the right, and as of that moment the repulsive force which has been built up between magnets 13 and 14 will be released by accelerating elongate sickle knife 3 to the right. Thereby, it will be clear that the repulsive force forms potential energy. A similar, mirrored process will find place when the elongate sickle knife 3 is moved to the right-hand side, by the magnets 15 and 16. In this manner, the accumulation means 12 absorb at least a part of the acceleration and deceleration forces, so that these forces are not transmitted to the actuator 17 and the actuating components 18 and 19. Particularly, the component 19 connecting the arm 18 of the actuator 17 with the bar 8 of the elongate sickle knife 3 proves to bear in a conventional set-up an extremely high load. Therefore, relieving this structural component 19 from at least a part of this high load significantly improves the reliability of the elongate sickle knife drive system. In the example of FIG. 2, the accumulator means 12 extend between the frame 2 and the elongate sickle knife 3 because magnets 13 and 16 are rigidly mounted to the frame 2 while magnets 14 and 15 are mounted to the elongate sickle knife 3. These magnets operationally cooperate to accumulate and release energy.

The example of FIG. 2 is only one example, and it will be clear that the accumulator means 12 can also be formed by other types of accumulators as will be evident from the following figures.

Figure 3:
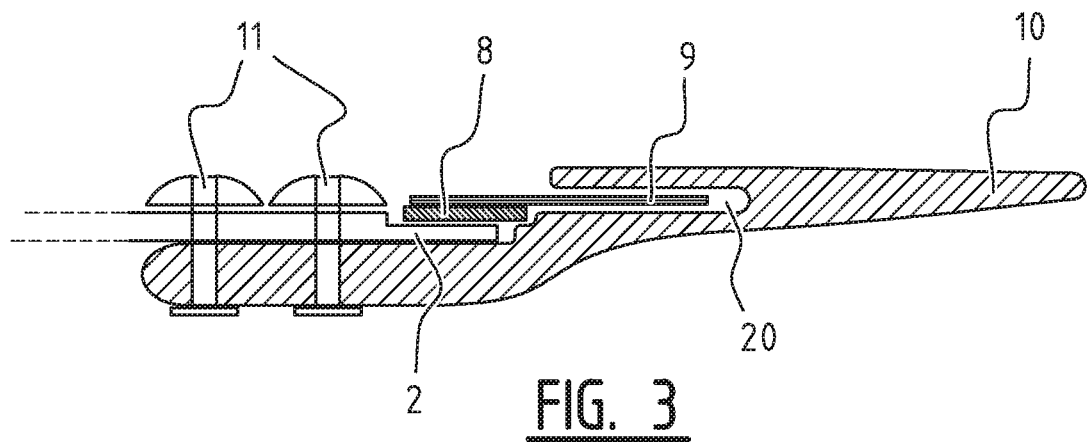
FIG. 3 shows a cross section of the header of FIG. 2, in accordance with an exemplary embodiment of the present invention.

FIG. 3 shows a cross-section which is indicated in FIG. 2 with A-A, in accordance with an exemplary embodiment of the present invention. Thereby, FIG. 3 shows how the guard 10 comprises a slit 20. The elongate sickle knife 3 with the bar 8 and the knives 9 are at least partially captured in the slit 20 so that the movement of the bar 8 and the knives 9 is limited. Particularly, due to the slit 20 extending over at least a part of the knives 9, an upward movement of the knives 9 is prevented. Furthermore, since the slit 20 has a predetermined depth, forward movement of the knives 9 is also prevented. In this manner, the elongate sickle knife 3 and the bar 8 and the knives 9 are mounted in a predetermined position with respect to the header 2 while movement in the transverse direction is allowed. The figure further shows how the guard 10 is connected to the frame 2 via bolts 11.

Figure 4:
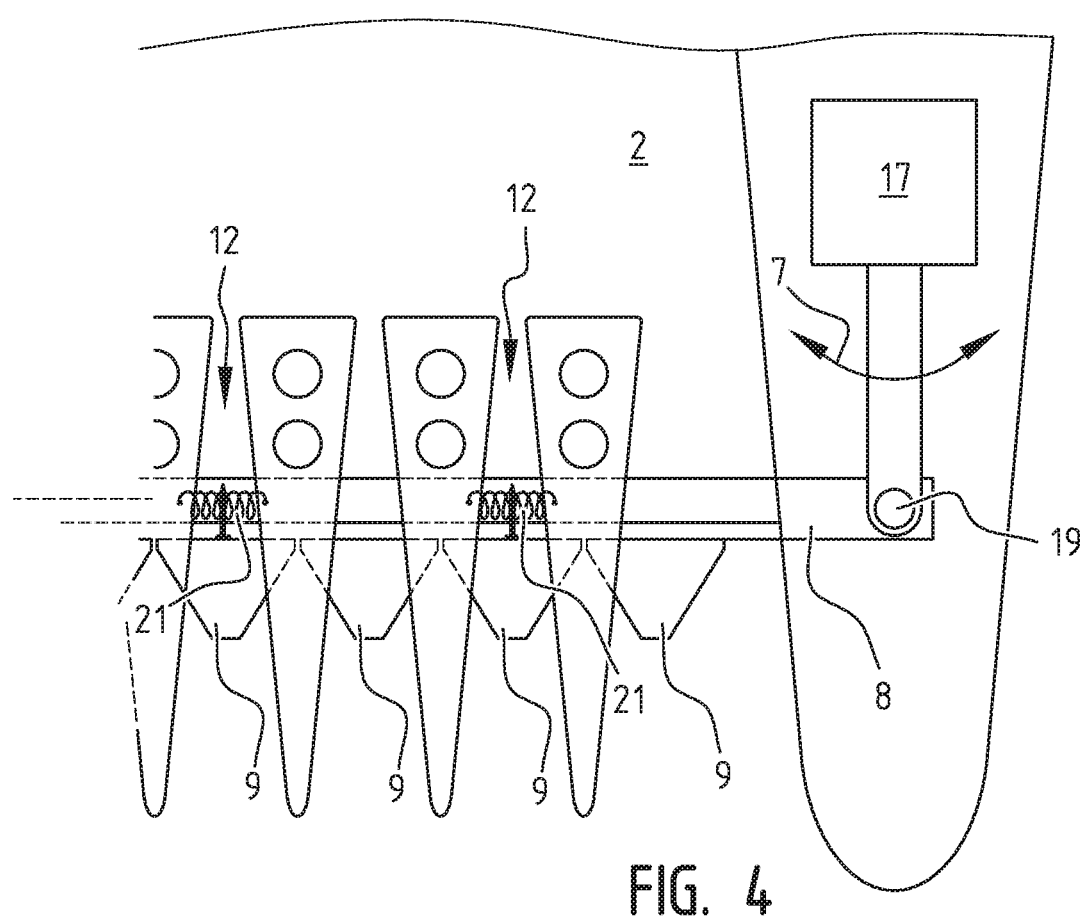
FIG. 4 shows a bottom view of a section of an exemplary alternative embodiment of the header of FIG. 1, in accordance with an exemplary embodiment of the present invention.

FIG. 4 shows a further exemplary embodiment of the present invention and shows an underside of the header 2. FIG. 4 shows how the accumulator means 12 are formed by multiple spring elements 21 which are mounted between the header frame 2 and the elongate sickle bar 8. The spring elements 21 are formed as coil springs, extending between the header frame 2 and the elongate sickle bar 8. In the embodiment shown in FIG. 4, the spring elements 21 extend substantially parallel to the transverse movement of the elongate sickle bar 8, and are connected with a middle segment to the elongate sickle bar 8, while the end parts of the spring coil 21 are connected to the frame 2. This allows the spring elements 21 to accumulate energy in a movement of the elongate sickle bar 8 from a central position, also named the intermediate position, towards a left position, also named a first position, as well as from the central position towards a right position, also named a second position. Thereby, the spring 21 also releases the accumulated energy in the opposite directions. In this manner, acceleration and deceleration of the elongate sickle bar 8 is assisted by the accumulator means 12. Because multiple accumulator means 12 are provided, and are distributed over the length of the elongate sickle bar 8, tensions and stresses in sickle knife bar elements 9 can be further reduced.

The skilled person will understand that the accumulator means 12 can alternatively be formed by other systems able to transform kinetic energy into potential energy and vise versa. Examples of such alternative accumulator means 12 are hydraulic accumulator means, pneumatic accumulator means, and electro-magnetic accumulator means. An advantage of the electro-magnetic accumulator means is that electro-magnets may not only be used for accumulating and releasing energy, but also for driving, correcting or influencing the elongate sickle bar 8 movement. This allows further optimization of power usage to drive the elongate sickle bar 8 and of forces acting on elongate sickle bar drive components.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A header for an agricultural vehicle, the header comprising:
   a header frame having a leading edge; and
   an elongate sickle knife mounted along the leading edge of the header frame;
   an actuator for reciprocally moving the elongate sickle knife in its longitudinal direction relative to the header frame between a first position and a second position over an intermediate position; and
   at least one accumulator extending between the header frame and the elongate sickle knife to accumulate energy during a first movement of the elongate sickle knife from the intermediate position towards at least one of the first position and the second position, the at least one accumulator accumulating energy at all times during the first movement, wherein the actuator decelerates the sickle knife and during deceleration energy is accumulated in the at least one accumulator, and to release accumulated energy during a second movement of the elongate sickle knife opposite the first movement.

2. The header of claim 1, wherein the first movement comprises a first part in which the elongate sickle knife moves from the intermediate position towards the first position, and a second part in which the elongate sickle knife moves from the intermediate position towards the second position, and wherein the at least one accumulator accumulates energy in both the first and the second parts of the first movement, and wherein the second movement comprises corresponding parts opposite to the first and second parts of the first movement.

3. The header of claim 1, wherein the at least one accumulator is formed as at least one spring element.

4. The header of claim 3, wherein the at least one spring element comprises a plurality of spring elements distributed along a length of the elongate sickle knife.

5. The header of claim 4, wherein the plurality of spring elements are mounted at an underside of the header.

6. The header of claim 1, wherein the header frame comprises a plurality guards extending forward from the leading edge and distributed along the leading edge, wherein the plurality of guards each comprises a slit and wherein the elongate sickle knife is positioned at least partially through the slits of the plurality of guards to guide the elongate sickle knife in its longitudinal direction.

7. The header of claim 6, wherein the elongate sickle knife comprises a plurality of knife sections attached along a length of the elongate sickle knife in such a manner that a reciprocal movement of the elongate sickle knife results in a shearing action which severs plant stems and stalks captured between the knife sections and the plurality of guards.

8. The header of claim 1, wherein the accumulated energy is released during the second movement by accelerating the elongate sickle knife in the second movement.

9. A header for an agricultural vehicle, the header comprising:
   a header frame having a leading edge; and
   an elongate sickle knife mounted along the leading edge of the header frame;
   an actuator for reciprocally moving the elongate sickle knife in its longitudinal direction relative to the header frame between a first position and a second position over an intermediate position; and
   accumulator means extending between the header frame and the elongate sickle knife to accumulate energy during a first movement of the elongate sickle knife from the intermediate position towards at least one of the first position and the second position, the at least one accumulator accumulating energy at all times during the first movement, wherein the actuator decelerates the sickle knife and during deceleration energy is accumulated in the at least one accumulator, and to release accumulated energy during a second movement of the elongate sickle knife opposite the first movement.

10. The header of claim 9, wherein the first movement comprises a first part in which the elongate sickle knife moves from the intermediate position towards the first position, and a second part in which the elongate sickle knife moves from the intermediate position towards the second position, and wherein the accumulator means accumulate energy in both the first and the second parts of the first movement, and wherein the second movement comprises corresponding parts opposite to the first and second parts of the first movement.

11. The header of claim 9, wherein the accumulator means are formed as at least one spring element.

12. The header of claim 11, wherein the at least one spring element comprises a plurality of spring elements distributed along a length of the elongate sickle knife.

13. The header of claim 12, wherein the plurality of spring elements are mounted at an underside of the header.

14. The header of claim 9, wherein the header frame comprises a plurality guards extending forward from the leading edge and distributed along the leading edge, wherein the plurality of guards each comprises a slit and wherein the elongate sickle knife is positioned at least partially through the slits of the plurality of guards to guide the elongate sickle knife in its longitudinal direction.

15. The header of claim 14, wherein the elongate sickle knife comprises a plurality of knife sections attached along a length of the elongate sickle knife in such a manner that a reciprocal movement of the elongate sickle knife results in a shearing action which severs plant stems and stalks captured between the knife sections and the plurality of guards.

16. The header of claim 9, wherein the accumulated energy is released during the second movement by accelerating the elongate sickle knife in the second movement.

17. A method for operating a header for an agricultural vehicle, wherein the header comprises a header frame and an elongate sickle knife mounted along a leading edge of the header, the method comprising steps of:
   reciprocally moving the elongate sickle knife in its longitudinal direction relative to the header frame by an actuator between a first position and a second position over an intermediate position;
   accumulating energy in at least one accumulator mounted between the header frame and the elongate sickle knife, at all times during a first movement of the elongate sickle knife from the intermediate position towards at least one of the first position and the second position, wherein the step of accumulating energy comprises decelerating the elongate sickle knife with the actuator, and
   releasing accumulated energy during a second movement of the elongate sickle knife opposite to the first movement.

18. The method of claim 17, wherein the step of releasing accumulated energy comprises accelerating the elongate sickle knife in the second movement.

* * * * *